(12) United States Patent
Nguyen et al.

(10) Patent No.: US 12,205,348 B2
(45) Date of Patent: Jan. 21, 2025

(54) NEURAL NETWORK ORCHESTRATION

(71) Applicant: Veritone, Inc., Costa Mesa, CA (US)

(72) Inventors: Peter Nguyen, Costa Mesa, CA (US); Karl Schwamb, Mission Viejo, CA (US); David Kettler, Bellevue, WA (US)

(73) Assignee: VERITONE, INC., Costa Mesa, CA (US)

( * ) Notice: Subject to any disclaimer, the term of this patent is extended or adjusted under 35 U.S.C. 154(b) by 1224 days.

(21) Appl. No.: 16/156,938

(22) Filed: Oct. 10, 2018

(65) Prior Publication Data
US 2020/0042825 A1     Feb. 6, 2020

Related U.S. Application Data

(60) Provisional application No. 62/713,937, filed on Aug. 2, 2018.

(51) Int. Cl.
*G06V 10/764* (2022.01)
*G06F 18/20* (2023.01)
(Continued)

(52) U.S. Cl.
CPC .......... *G06V 10/764* (2022.01); *G06F 18/217* (2023.01); *G06F 18/24155* (2023.01);
(Continued)

(58) Field of Classification Search
CPC ......... G10L 15/16; G10L 15/02; G10L 15/04; G10L 15/063; G10L 15/22; G10L 15/32;
(Continued)

(56) References Cited

U.S. PATENT DOCUMENTS 7,089,217 B2 *   8/2006   Kasabov ................ G06N 3/043
                                                                706/14
8,306,931 B1 *  11/2012   Bowman ................ G06N 3/045
                                                                706/26
(Continued)

OTHER PUBLICATIONS

Chollet, F., "Deep Learning with Python", 2008, pp. 233-268, Manning Publications Company.
(Continued)

*Primary Examiner* — Qun Shen
(74) *Attorney, Agent, or Firm* — One LLP

(57) ABSTRACT

Rather than randomly selecting neural networks to classify a media file, the conductor can determine which neural network engines (from the conductor ecosystem of neural networks) are the best candidates to classify a particular portion/segment of the media file (e.g., audio file, image file, video files). The best candidate neural network engine(s) can depend on the nature of the input media and the characteristics of the neural network engines. In object recognition and identification, certain neural networks can classify vehicles better than others, while another group of neural networks can classify structures better. The conductor can take out the guess work and construct in real-time an inter-classifier neural network using one or more layers selected from one or more pre-trained neural network, based on attribute(s) of the media file, to classify the media file.

20 Claims, 10 Drawing Sheets

(51) Int. Cl.
*G06F 18/21* (2023.01)
*G06F 18/2415* (2023.01)
*G06N 3/04* (2023.01)
*G06N 3/045* (2023.01)
*G06N 3/047* (2023.01)
*G06N 3/08* (2023.01)
*G06N 5/01* (2023.01)
*G10L 15/02* (2006.01)
*G10L 15/04* (2013.01)
*G10L 15/06* (2013.01)
*G10L 15/16* (2006.01)
*G10L 15/22* (2006.01)
*G10L 15/32* (2013.01)
*G10L 25/78* (2013.01)

(52) U.S. Cl.
CPC ............ *G06F 18/285* (2023.01); *G06N 3/04* (2013.01); *G06N 3/045* (2023.01); *G06N 3/047* (2023.01); *G06N 3/08* (2013.01); *G10L 15/02* (2013.01); *G10L 15/04* (2013.01); *G10L 15/063* (2013.01); *G10L 15/16* (2013.01); *G10L 15/22* (2013.01); *G10L 15/32* (2013.01); *G10L 25/78* (2013.01); *G06N 5/01* (2023.01)

(58) Field of Classification Search
CPC .... G10L 25/78; G06K 9/6227; G06K 9/6262; G06K 9/6278; G06N 3/04; G06N 3/0454; G06N 3/0472; G06N 3/08
See application file for complete search history.

(56) References Cited

U.S. PATENT DOCUMENTS

| | | | | |
|---|---|---|---|---|
| 10,354,184 | B1* | 7/2019 | Vitaladevuni | G06Q 30/0201 |
| 2003/0063780 | A1* | 4/2003 | Gutta | G06V 40/172 |
| | | | | 382/118 |
| 2007/0005537 | A1* | 1/2007 | Abdulkader | G06F 18/28 |
| | | | | 706/20 |
| 2012/0084859 | A1* | 4/2012 | Radinsky | G06F 21/56 |
| | | | | 707/E17.046 |
| 2017/0068888 | A1* | 3/2017 | Chung | G06N 3/0454 |
| 2017/0286809 | A1* | 10/2017 | Pankanti | G06N 3/04 |
| 2018/0129930 | A1* | 5/2018 | Shin | G06N 3/0472 |
| 2018/0137857 | A1 | 5/2018 | Zhou et al. | |
| 2018/0286412 | A1* | 10/2018 | Amsterdam | G10L 17/06 |
| 2019/0012594 | A1* | 1/2019 | Fukuda | G06N 3/04 |
| 2019/0102678 | A1* | 4/2019 | Chang | G06V 10/82 |
| 2021/0004682 | A1* | 1/2021 | Gong | G06N 3/08 |

OTHER PUBLICATIONS

WO, PCT/US2019/044817 ISR and Written Opinion, Oct. 25, 2019.

Chollet, F., "Deep Learning with Python", 2008, pp. 1-384, Manning Publications Company.

Wang et al., Skip Net: Learning Dynamic Routing in Convolutional Networks, Jul. 2018. (Year: 2018).

Mohammadi et al., S-NN: Stacked Neural Networks, May 2016. (Year: 2016).

Zahavy et al., Is a Picture Worth a Thousand Words? A Deep Multi-Modal Architecture for Product Classification in E-commerce; The Thirtieth AAAI Conference on Innovative Applications of Artificial Intelligence (IAAI-18), pp. 7873-7880, Feb. 2018. (Year: 2018).

Girshick et al., Rich Feature Hierarchies for Accurate Object Detection and Semantic Segmentation, Oct. 2014. (Year: 2014).

* cited by examiner

NEURAL NETWORK ORCHESTRATION

CROSS-REFERENCE TO RELATED APPLICATIONS

This application claims priority to and benefit of U.S. Provisional Application No. 62/713,937 entitled "MACHINE LEARNING", filed Aug. 2, 2018, the disclosure of which is incorporated herein by reference in its entirety for all purposes.

BACKGROUND

Based on one estimate, 90% of all data in the world today are generated during the last two years. Quantitively, that is more than 2.5 quintillion bytes of data are being generated every day; and this rate is accelerating. This estimate does not include ephemeral media such as live radio and video broadcasts, most of which are not stored.

To be competitive in the current business climate, businesses should process and analyze big data to discover market trends, customer behaviors, and other useful indicators relating to their markets, product, and/or services. Conventional business intelligence methods traditionally rely on data collected by data warehouses, which is mainly structured data of limited scope (e.g., data collected from surveys and at point of sales). As such, businesses must explore big data (e.g., structured, unstructured, and semi-structured data) to gain a better understanding of their markets and customers. However, gathering, processing, and analyzing big data is a tremendous task to take on for any corporation.

Additionally, it is estimated that about 80% of the world data is unreadable by machines. Ignoring this large portion of unreadable data could potentially mean ignoring 80% of the additional data points. Accordingly, to conduct proper business intelligence studies, businesses need a way to collect, process, and analyze big data, including machine unreadable data.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies.

Figure 1:
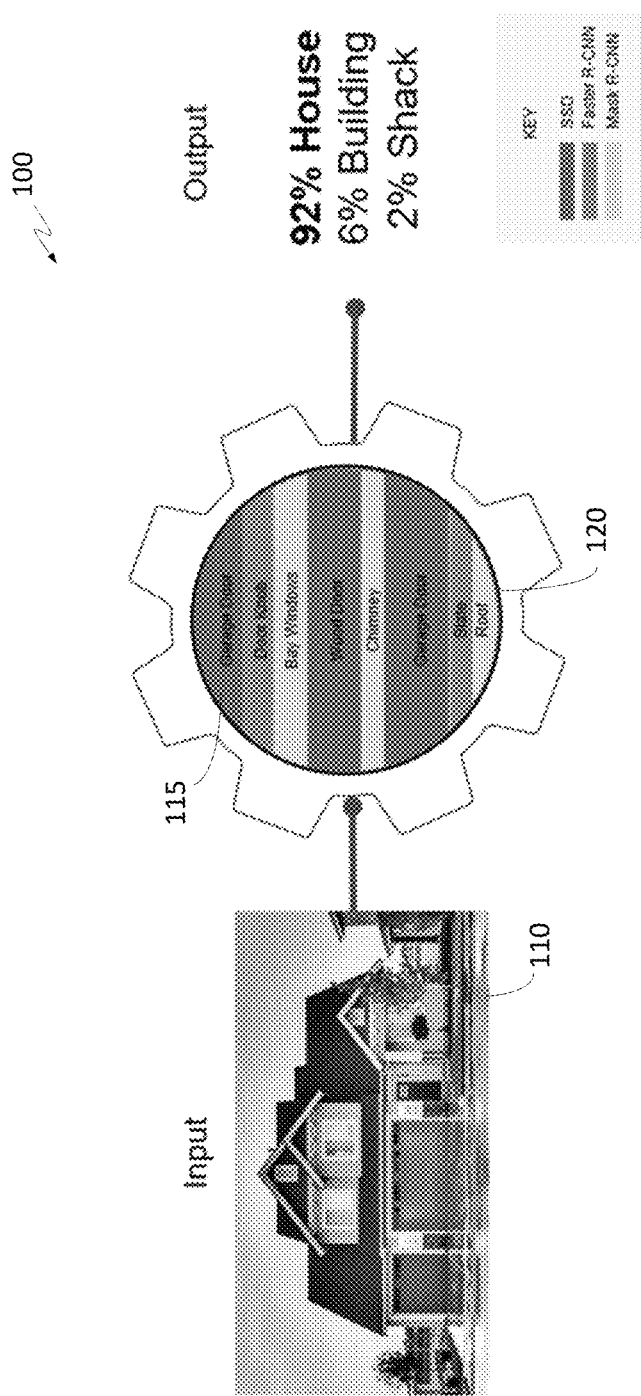
FIG. 1 illustrates a multi-class neural network model in accordance with an aspect of the disclosure.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

DETAILED DESCRIPTION

Overview

At the beginning of the decade (2010), there were only a few available commercial AI engines. Today, there are well over 10,000 AI engines. It is expected that this number will exponentially increase within a few years. With so many commercially available neural network engines, it is almost an impossible task for businesses to choose which neural network engines will perform the best for their type of data. Veritone's AI platform with the conductor and inter-classifier technologies make that impossible task practical and efficient.

There are various neural network architectures such as Faster R-CNN, SSD, Mask R-CNN, YOLO, etc. Each neural network architecture has its own strengths and generates unique outputs based on its set of classifiers. A classifier is a learning model that is configured to encode features of an object or an audio waveform on one or more layers, and to classify the object or the audio waveform as outputs. Each neural network contains a set (e.g., collection) of classifiers such as, for example, classifiers for doors, windows, roof types, wall types, cats, dogs, birds, etc.

These neural networks (e.g., machine learning) applications are also termed "cognitive engines" and typically address a single area of cognition such as speech transcription and object recognition. The operation of cognitive engines is coordinated by users through the specification of workflow graphs. These graphs specify the media inputs to process and what cognitive engines to apply. For each cognitive area, users are typically faced with choosing between multiple neural network engines: how many to include, what accuracy is desired, and the cost of running multiple neural network engines.

The pace of change and the number of available neural networks can make it extremely difficult for users to keep up-to-date with their workflows. The disclosed conductor and inter-classifier technologies improve the usability of the large neural network ecosystem (which can be referred to as the conductor ecosystem). The neural network selection function of the conductor and conducted technologies is learned using a neural network so that it can be regularly updated without human intervention.

Neural network engine(s) selection can be implemented both before and after an initial neural network engine is executed (e.g., classify an image). For example, prior to running any neural network engines, the conductor can determine which neural network engines (from the conductor ecosystem) are the best candidates to classify a particular portion/segment of a media file (e.g., audio file, image file, video files). The best candidate neural network engine(s) can depend on the nature of the input media and the characteristics of the neural network engines. In speech transcription, certain neural network engines will be able to process special dialects better than others. Some neural network engines are better at processing noisy audio than others. It is best to include neural network engines that will perform well based on characteristics of the input media. In object recognition and identification, certain neural network engines can classify cats better than others, while another group of neural network engines can classify dogs better.

After one or more neural network engines have been executed, classification results from each neural network engine are analyzed and the best output is identified. Neural network engines typically produce a prediction along with a confidence in that prediction. The choice of final output must be made by considering the predictions made, the reported confidences, characteristics of the input, and characteristics of the neural network engines. In some embodiments, a performance score can be assigned to each of the classification result if a confidence score is not provided by the neural network engine.

Inter-Classifier Neural Network

FIG. 1 illustrates how a pre-trained a conducted learning (e.g., inter-classifier) neural network 100 uses layers from various classifiers of different neural network architectures to produce a highly accurate classification of an object (e.g., a house) in accordance with some embodiments of the disclosure. In some embodiments, inter-classifier neural network 100 can be a collection of layers selected from two or more different neural network architectures. This collection of layers creates a new-fully-layered neural network, which made up inter-classifier neural network 100. As shown in FIG. 1, inter-classifier neural network 100 includes layers selected from a SSD neural network, a Faster R-CNN neural network, and a Mask R-CNN neural network. The new fully-layered neural network is generated by a conducted learning process to classify the input 110.

In some embodiments, layer 115 can comprise one or more layers from one or more pre-trained neural network engines, of the SSD architecture, that encode a garage door onto the one or more layers. For example, layer 115 can comprise four hidden layers from a SSD neural network that is pre-trained to classify garage doors. Similarly, layer 120 can comprise one or more layers from one or more pre-trained neural network engines, of the Mask R-CNN architecture, that encode a roof onto the one or more layers. For example, layer 120 can comprise two hidden layers of a Mask R-CNN neural network that is pre-trained to classify various types of roof. Each layer may be trained using feature sets of an object or an audio waveform. For example, layer 120 can be previously trained using training data sets having various types of roof.

The classification output by the new fully-layered neural network (inter-classifier neural network 100) can have a percentage of accuracy higher than any of the three architectures (i.e., SSD, Faster R-CNN, Mask-R-CNN) can produce on its own. In other words, using the one or more layers from various pre-trained neural networks, inter-classifier neural network 100 can classify input 110 as a house more accurately and faster than any single neural network working alone.

Figure 2:
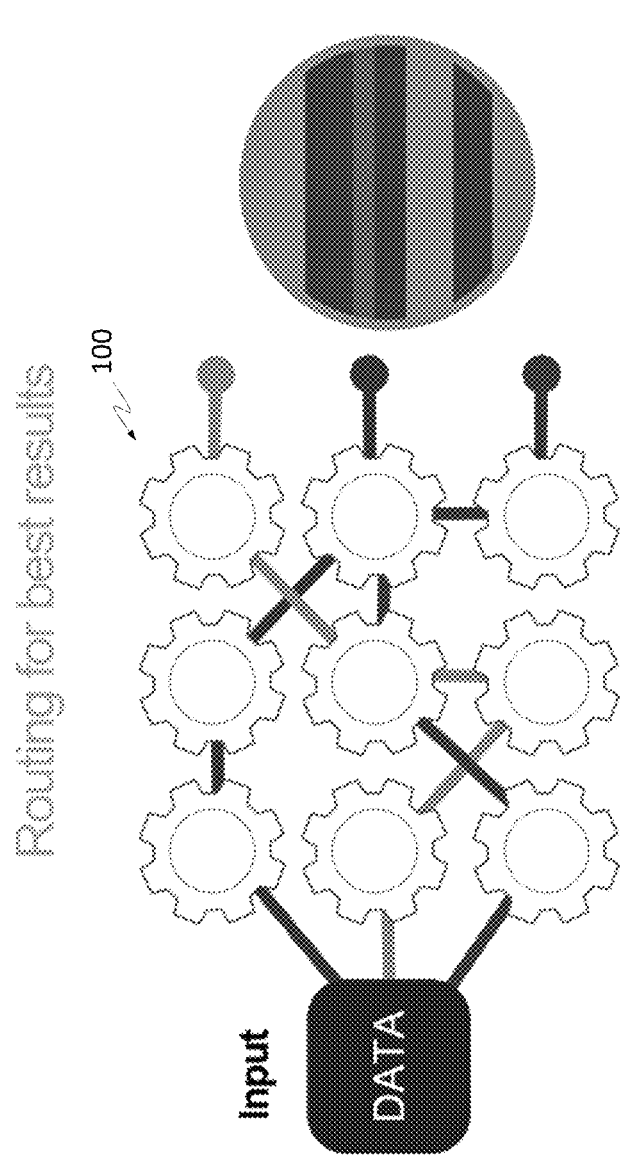
FIGS. 2 and 3 illustrate inter-classifier processes in accordance with aspects of the disclosure.

FIG. 2 is a flow diagram of a classification process 200 using an inter-classifier neural network in accordance with some embodiments of the disclosure. As shown in FIG. 2, input data are ingested. In some embodiments, the input data can optionally be preprocessed using various data preprocessing module, a deep speech neural network, or other types of neural networks (e.g., CNN) to obtain extra features. In process 200, rather than providing the input data to a single architecture neural network, process 200 provides the input data to inter-classifier neural network 100. In some embodiments, based on an attribute of the input media file (e.g., audio waveform feature, image feature, etc., inter-classifier neural network 100 can construct a fully-connected network using a collection of layers from one or more independent pre-trained neural networks. The selected collection of layers has already been learned by inter-classifier neural network 100 via a conducted learning process that learns which combination of layers can best classify which types of object, attributes of a media file, or segment of a media file, etc. In FIG. 2, each cog represents one or more layers of a plurality of independent neural networks, each of which is pre-trained to perform a classification task. In some embodiments, inter-classifier neural network 100 can determine in real-time, based on one or more attributes of the input file or object within an image, which path to take (or which combination of cogs to select) to classify the input file. As alluded to, inter-classifier neural network 100 can achieve this by performing a conducted learning process where it learns which combination of layers from various independent and pre-trained neural networks can classify which types of objects and/or audio clips best. The number of pre-trained neural networks (e.g., classifiers) in the conductor ecosystem can be thousands or more, and the number of hidden layers can be hundreds of thousands or more.

In some embodiments, depending on one or more attributes of a portion of an image, inter-classifier neural network 100 can select different layers from one or more pre-trained neural networks to form a fully-layered network to classify a portion of an image. Inter-classifier neural network 100 can form (in parallel) a second fully-layered network to classify a second portion of the image or an entirely different image. Inter-classifier neural network 100, can form multiple fully-layered networks to classify multiple images or multiple portions of an image. Each fully-layered network created for a corresponding portion of an image can have its own unique combination of layers (e.g., hidden layers) from one or more pre-trained neural networks in the conductor ecosystem. In other words, each fully-layered network can itself be an inter-classifier neural network. With reference to FIG. 2, each object or picture that needs to be classified has its own unique the path through the cogs (layers) of inter-classifier neural network 100. Again, each path (collection of layers) can be considered an ad hoc inter-classifier neural network because the layers can be constructed in real-time from different layers of different classes of different neural networks—each of which is pre-trained. For example, an image of a car may take the top-most path, which can comprise of multiple neural networks, each neural network can be pre-trained to classify the same or different objects. In some embodiments, a layer selection model (neural network) can construct a plurality of inter-classifier neural networks using layers from the conductor ecosystem, during the training phase, based on attributes of the training data set(s). An ad hoc inter-classifier neural network can be considered to be a neural network that is constructed from one or more layers of the collection of layers of inter-classifier neural network 100.

Figure 3:
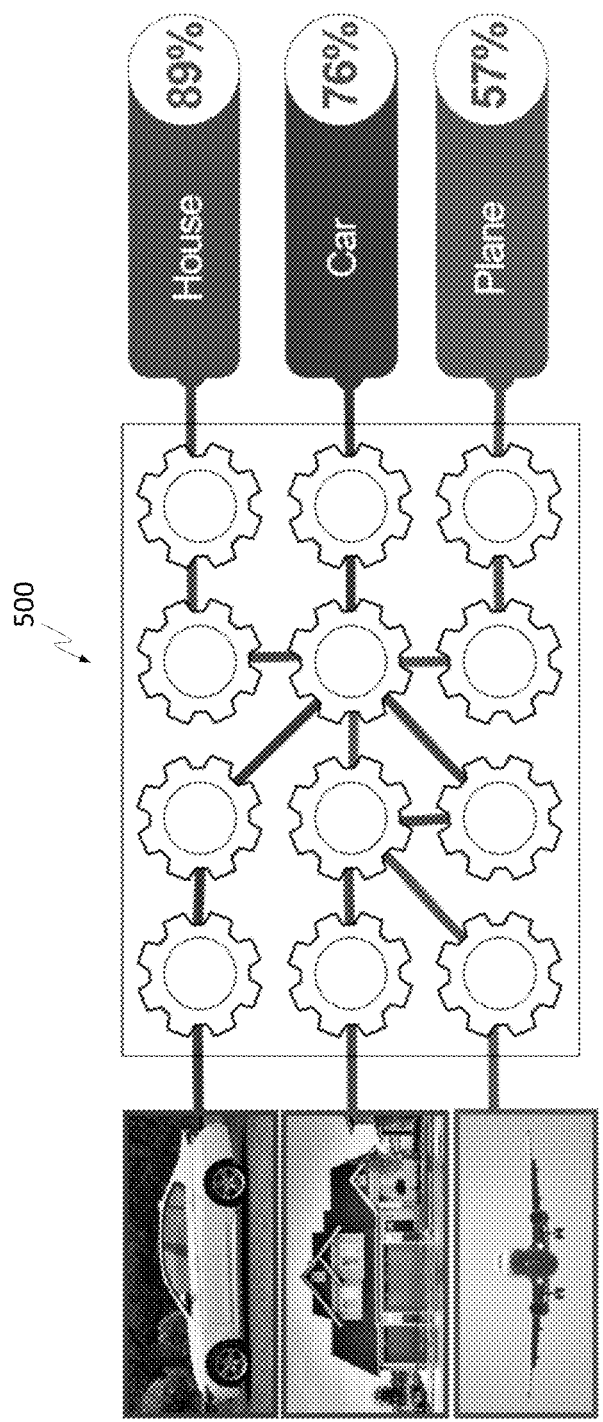

FIG. 3 illustrates how inter-classifier neural network 100 routes data through various classifiers (e.g., layers of AI neural network engines) in accordance with some embodiments of the disclosure. In FIG. 3, each cog can represent one or more neural network architectures within the conductor ecosystem of inter-classifier neural network 100. In some embodiments, inter-classifier neural network 100 can comprise a collection of layers from various neural networks in the conductor ecosystem. As shown, the image of the house (which can be a segment of an input file) is best classified using layers from six different neural network engines. Each neural network engine may have different neural network architecture. In some embodiment, one or more layers can have the same neural network architecture (e.g., SSD) but are created by different commercial entities (and thus may yield different classification prediction). Similarly, the image of the car (which can be another segment from the same input media file) can best be classified using layers of four different neural network engines. The image of the airplane can be classified using five different neural networks.

In some embodiments, each cog can represent one or more layers of a neural network within the conductor ecosystem of inter-classifier neural network 100, and each row of cogs can represent a different neural network. In this embodiment, the image of the house can be best classified using layers from three different neural network engines. The image of the car can best be classified using layers of two different neural network engines, and the image of the airplane can be classified using two different neural networks. In some embodiments, each column of cogs can represent a neural network.

Figure 4:
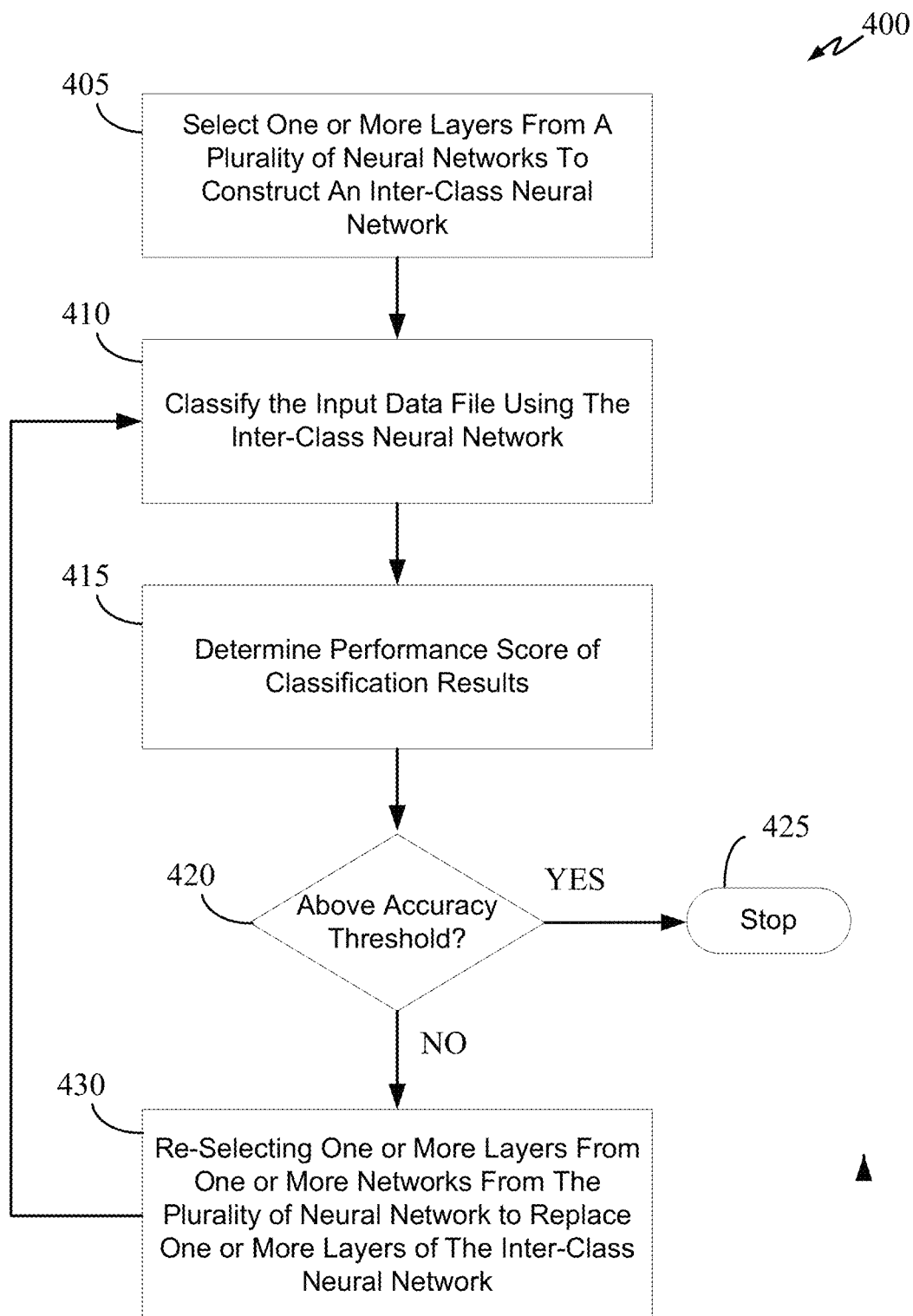
FIG. 4 is a flow diagram of a training process in accordance with an aspect of the disclosure.

FIG. 4 is a flow chart illustrating process 400 for training a layer selection model to construct an inter-classifier neural networks (e.g., classifiers) in accordance with some embodiments of the disclosure. The layer selection model can be trained using training data sets to map feature(s) of a layer to a certain classification outputs (e.g., house, car, cat, etc.) of the training data set. Process 400 starts at 410 where one or more layers from the one or more pre-trained neural networks are selected to create a new inter-classifier neural network model based on attributes of an input file or a portion of an input file. The input file can be an audio file, an image file, or a video file. Attributes of an audio file can be the audio waveform, noise profile, energy band, entropy of a signal, etc. Attributes of an image file can be the types of object being detected in the image (e.g., animal, human, machinery, structure, etc.), color intensity, a segment of an image, etc.

As the name implies, each pre-trained neural network (e.g., classifier) is pre-trained to perform a classification task such as classifying a portion of an image, an audio portion, etc. The new inter-classifier neural network model (or simply neural network) can be considered a sub-neural network as process 400 can be repeated to construct multiple fully-layered inter-classifier neural networks—one inter-classifier neural network for each portion or object of an image. To construct the fully-layered-inter-classifier neural network (at 405), process 400 can select one or more layers from the conductor ecosystem having many (e.g., hundreds of thousands) pre-trained neural networks. Process 400 can select any number of layers (e.g., zero, two, or ten) from any neural network in the conductor ecosystem. For example, process 400 can select one layer from a first neural network, three layers from a second neural network, 5 layers from a third neural network, and 2 layers from a fourth neural network. Each of the selected neural network can have the same or different network architecture (e.g., SSD, CNN, R-CNN, etc.).

Process 400 can select one or more layers from various neural networks to create a multi-class and inter-classifier neural network 100. Although the first, second, third, fourth neural networks are described in sequence, these networks can be located at any position among the thousands of pre-trained neural networks in the ecosystem. Additionally, at 405, process 400 can select adjacent layers, non-adjacent layers, or layers that are the furthest apart from each other (e.g., top most and bottom most) in a neural network. In some embodiments, each layer can be flattened, concatenated, and/or merged with the other layers to form a fully-layered network.

As previously mentioned, the conductor ecosystem that process 400 uses to select one or more layers can have hundreds of thousands (or more) of layers. A single neural network in the conductor ecosystem can have hundreds or thousands of layers. Accordingly, to efficiently select and test a layer or a combination of layers that would produce the highest classification performance score, process 400 can use Bayesian optimization, which will be further discussed below.

In some embodiments, a portion of a layer or an entire layer of a neural network is selected. A portion of a layer can be selected by performing a neuron drop out process on a selected layer. In some embodiments, a portion of a layer can also be selected by flattening and concatenating the vector at one or more positions.

At 410, once the inter-classifier network is constructed, it is used to classify the input data file of a training data set, which can have hundreds of thousands or millions of files. In some embodiments, the data file can be classified in segments. At 415, a performance score is generated by comparing the classification results with the ground truth data of the input file. In some embodiments, each layer of each neural network can be scored on how well the layer leads to an accurate classification based on the image or audio feature of the input data file. This can be done by replacing the inter-classifier neural network model a single layer at a time, for example. In some embodiments, the combination of layers, from various pre-trained neural networks in the ecosystem, is scored on how well it classifies the input data file.

At 420, if the performance score is above an accuracy threshold (e.g., 80% probability that the classification is correct), the layer selection training process is completed at 425, and process 400 is repeated with another object in the input file or another training data input file. If the performance score is below the accuracy threshold, one or more layers from one or more of the pre-trained neural networks are selected to replace one or more layers of the inter-classifier neural network model. This creates a new inter-classifier neural network model. Process 400 can then be repeated from 410 until a satisfactory performance score is achieved.

The layer learning process of process 400 can be referred to as the conducted learning process, which is used to train the layer selection model to map feature(s) of one or more layers of a plurality of pre-trained neural networks to a certain classification outputs (e.g., house, car, cat, etc.) of the training data set.

Figure 5:
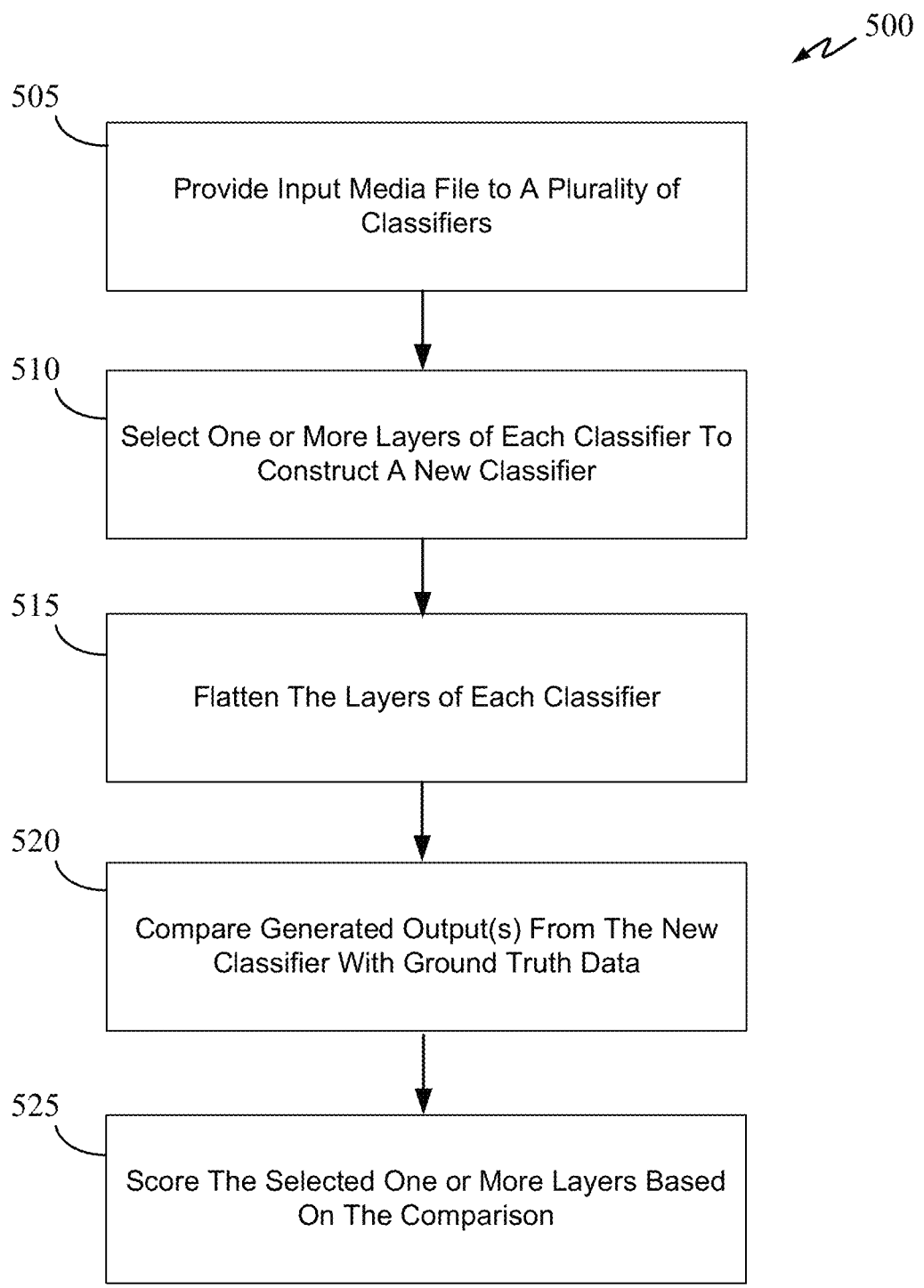
FIG. 5 is a flow diagram of a training process in accordance with an aspect of the disclosure.

FIG. 5 is a flow chart illustrating another training process 500 for the layer selection model in accordance with some embodiments of the disclosure. Training processes 400 and 500 can share one or more procedures as described below. Process 500 starts at 505 where one or more input media files (e.g., images, audio files) from one or more training data sets are provided to a set of pre-trained neural network. The one or more input media files may be pre-segmented based on an attribute of the input media file. For example, the one or more input media files can be segmented based on time duration and when there is a pause in the speech or audio of the one or more input media files. Each input media file of the training data set has a ground truth data to show the true object or transcription. At 505, an initial set of neural networks from the conductor ecosystem is selected to classify the one or more input media files. In this way, the layers of the initial set of neural networks are encoded by the classification process.

At 510, one or more layers from the initial set of neural networks (e.g., classifiers) are selected to construct a new-fully-layered neural network. It should be noted that one or more layers can be selected from each neural network of the initial set. The one or more selected layers can be consecutive or discontinuous. For example, the one or more selected layers can be the top most, middle, or bottom most layers of each neural network. The initial selection of layers can be made randomly. In some embodiments, a Bayesian optimization process is implemented to select one or more layers thereafter.

At 515, the layers within each classifier are flattened and/or concatenated before they are merged with other layers to from the new fully-layered neural network.

At 520, the outputs from the new fully-layered neural network are compared with ground truth data for each segment of the input media file. At 525, each of the one or more selected layer is scored based on the high-level accuracy between the classified output and the ground truth data. For example, if the classified outputs are very similar to the ground truth data, then the selected layer (or selected group of layers) can be assigned a high score. If the outputs are incorrect, a low score can be assigned such that the selected layer will not be selected again based on the features of the input media file. In some embodiments, the combination of layers is scored instead of scoring individual layer.

A portion or the entirety of process 500 can be repeated as many times as needed to explore various combinations of neural network engines and layers to find a configuration that produces the more accurate results.

Figure 6:
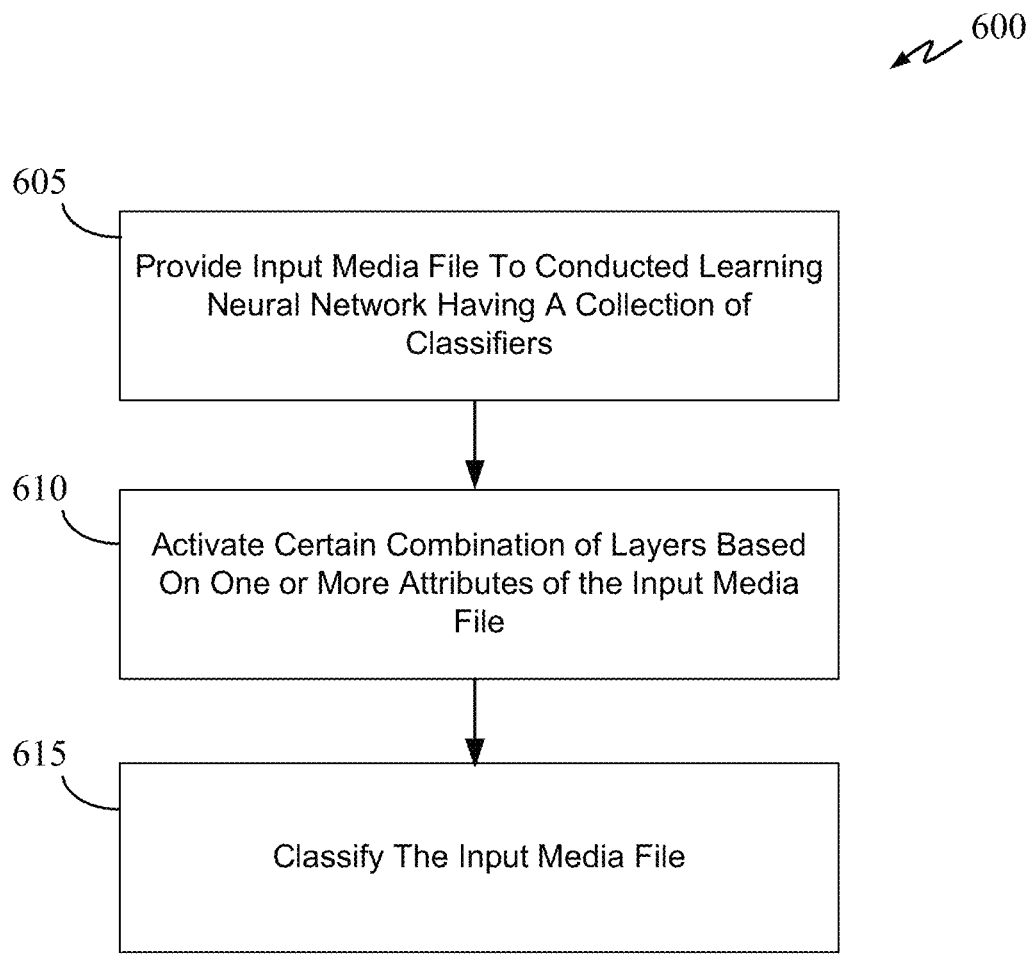
FIG. 6 is a flow diagram of a classification process in accordance with an aspect of the disclosure.

FIG. 6 is a flow chart illustrating a production process 600 for classifying an input media file in accordance with some embodiments of the disclosure. At 605, an input media file is provided to the inter-classifier neural network ecosystem, which has a massive collection of pre-trained neural networks. Referring back to processes 400 and 500 where a layer selection model is trained to map feature(s) of one or more layers of a plurality of pre-trained neural networks to a certain classification outputs (e.g., house, car, cat, etc.) of the training data set, at 610, process 600 performs almost the opposite task. At 610, attributes of the input media file are mapped to feature(s) of one or more layers of the plurality of neural network. Once those layers are identified (via the mapping process), they are activated to create, in real-time, a new inter-classifier neural network model. In other words, certain combination of layers is activated to form a new inter-classifier neural network based on one or more attributes (e.g., features) of the input media file. At 615, the new inter-classifier neural network model is used to classify the input media file or a portion of the input media file.

Figure 7:
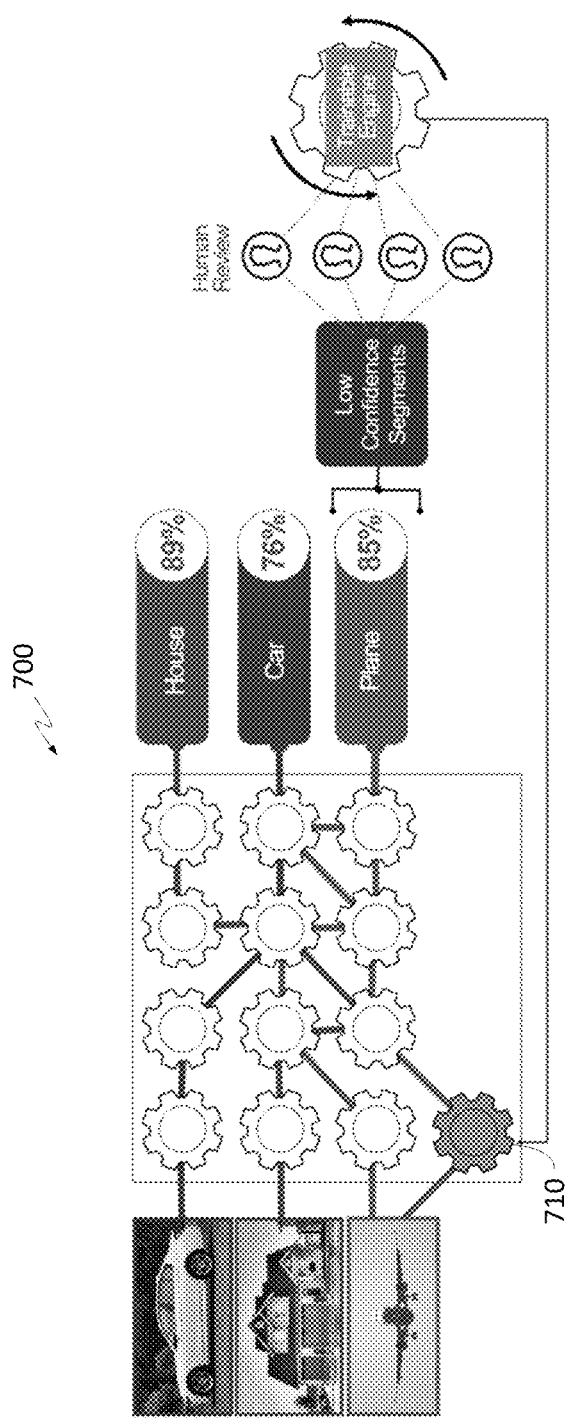
FIG. 7 is a flow diagram of the multi-class neural network model in accordance with an aspect of the disclosure.

FIG. 7 illustrates how inter-classifier neural network 100 routes data through various classifiers (e.g., AI neural network engines) in accordance with some embodiments of the disclosure. FIG. 7 further illustrates a process for generating a micro-model to address segments that have been classified with a low classification performance score. Previously in FIG. 3, the image of the airplane yielded a poor classification performance score of 57% accuracy. As shown in FIG. 7, micro model 710 can be added the collection of the classifiers 700. With the new micro model 710, the classification accuracy of the image of the airplane can be increased to 85% verses an accuracy of 57%.

In some embodiments, low confidence segments can be reviewed by a human operator, which can indicate whether the classified segments are correct or incorrect. If incorrect, another micro neural network engine can be generated to classify the low confidence segments. In other words, for results that return a low confidence in the prediction, a manual review of the data is performed, then a new "micro" neural network engine is trained to reroute the data through with the goal of increasing accuracy for that prediction.

Layers Selection

All neural network engines take some media as input. The input is then transformed through a series of operations into a prediction. In most neural networks, the operations are organized as a set of interconnected layers, each of which contains a set of neurons. Each subset of neurons (which may be a full layer, a portion thereof, or a collection of neurons across multiple layers) represents features that are helpful in predicting the final output of the neural network engine. But the neurons also provide abstractions of the input data and thereby serve to characterize the input as well.

By judicious selection of internal neural network engine features, useful features can be obtained that characterize the nature of the input and help predict the accuracy of the neural network engine's output. The goal of feature selection is to find a set of features that characterizes the input well enough to make good neural network engine selection.

In some embodiments, the neural network engine selection function to be learned takes as input set of labelled training data that includes: [I, $F_{E1}$, ..., $F_{EN}$] and these labelled outputs P. The labelled output is typically represented as a bit vector with each bit indicating whether the neural network engine should be included or not. In the above equation, E is the neural network engine; $F_E$ is the feature set of each neural network engine; N for the number of available neural network engines; and P is the set of predictions of the selected neural network engines. I the neural network engine input.

The selection algorithm uses a multi-layer neural network taking the above inputs and predicting the neural network engine selections. It is trained using a binary cross-entropy loss function to converge on a set of weights to select the appropriate neural network engines.

In some embodiments, layer selection process or module (e.g., 405, 510, etc.) is configured to select a set of neural network engine features to include in the selection algorithm. The selection algorithm may include selecting:
 i. Full Layer—Include all the features included within a given layer. The selection process reduces to selecting the appropriate layers to include
 ii. Partial Layer—Include some portion of the layer (e.g., much like the function of a dropout layer in CNNs, only some portion of a layer is retained for further processing.)
 iii. Neuron—Select individual neurons The layer selection module can select a full layer, a partial layer, or individual neurons from one or more neural networks in the conductor ecosystem to construct an inter-classifier neural network in real time or can be done ahead of time during a training phase. To find a useful layer, a search must be conducted over the set of available layers from each neural network engine. For complex neural network engines, it is costly to consider all combinations. Accordingly, a directed search can be performed. In some embodiments, a Bayesian optimization algorithm is used to select the combination of layers. The Bayesian optimization process includes:
1. Select an initial candidate set of layers randomly;
2. Classify training data and update candidate set until termination criteria;
3. Eliminate worst performing layers (lowest 50% performance)
4. Perform Bayesian optimization on the remaining layers
  a) Construct Bayesian network from remaining layers
  b) Generate new candidates from Bayesian network
  c). Evaluate neural network engine selection performance on new candidates.

In some embodiments, the initial candidate set of layers can be randomly selected from one or more neural network in the conductor ecosystem. In a neural network with a very large number of hidden layers, the initial candidate set of layers can be within a single network.

Next, the initial set of layers is then used to construct an interim (sub) neural network, which is then used to classify a set of training data. In some embodiments, a performance score can be assigned to each of the layer based on the classification result. Layers having a performing score below a given threshold (e.g., 50% accuracy) can be eliminated. The remaining layers from the initial set of layers can then be used to construct a Bayesian network using a Bayesian optimization algorithm, which produces a second set of candidate layers that will be used to construct another interim neural network. This new interim neural network is then used to classify the same set of training data (a different training data set can also be used). Next, a performance score is assigned to each of the layer or to a combination of layers based on the classification results. The Bayesian optimization process repeats until the desired performance score of each layer or the combination of layers is reached.

In some embodiments, post execution neural network engine selection can be performed. For the post-execution neural network engine selection case, a set of neural network engines has already run and the objective is to select the best output. The approach is similar to that above, with the addition of predictions, their associated confidences, and prediction output. The selection function to be learned takes as input a set of labelled training data that includes [I, FE1, . . . , FEN, . . . , PE1, . . . , PEN] and these labelled outputs P. The labelled output includes a predicted class (e.g. word from a transcription neural network engine or a bounding box and class from an object detection neural network engine, along with a confidence level in that class).

In some embodiments, the selection algorithm uses a multi-layer neural network, taking the above inputs, to output the predictions. It is trained using loss minimization functions such as MSE and categorical cross-entropy. Neural network engine feature selection is done in the same manner as discussed above.

Figure 8:
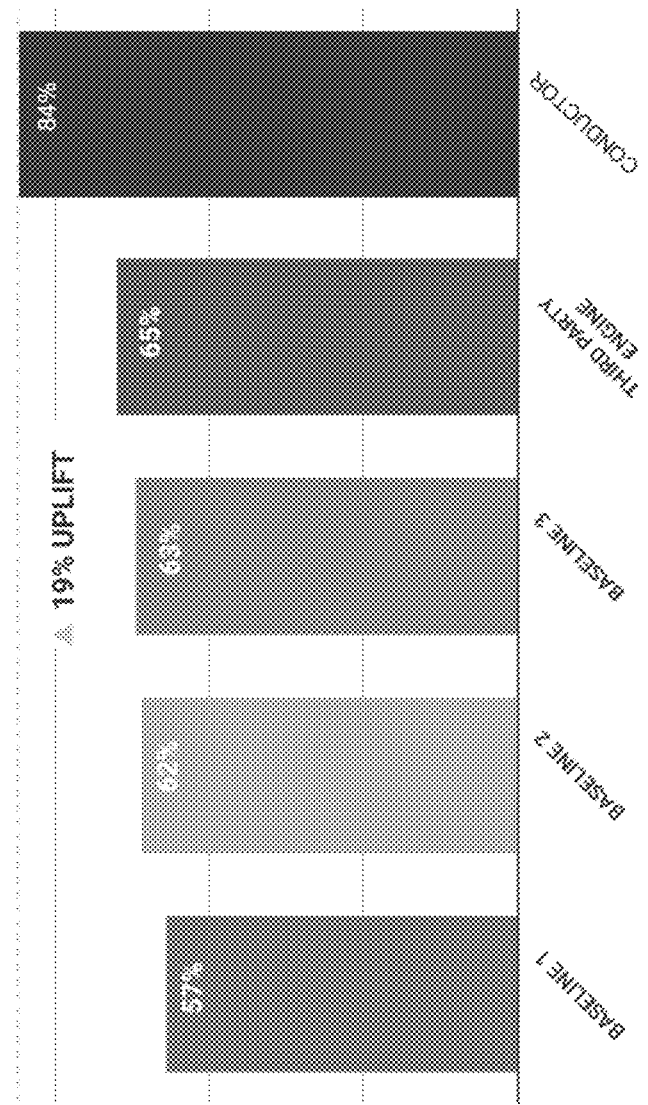
FIG. 8 is a graph illustrating the improvements using the conductor technology in accordance with aspects of the disclosure.

FIG. 8 is a bar chart illustrating the improvements for inter-classifier neural network 100 over standalone neural networks. As shown in FIG. 8, a typical baseline accuracy for any neural network engine is 57% to 65% accuracy. However, using the conductor's inter-classifier technology (e.g., creating a new micro model using one or more layers from different neural networks), the accuracy of the resulting outputs can be dramatically improved.

System Architecture

Figure 9:
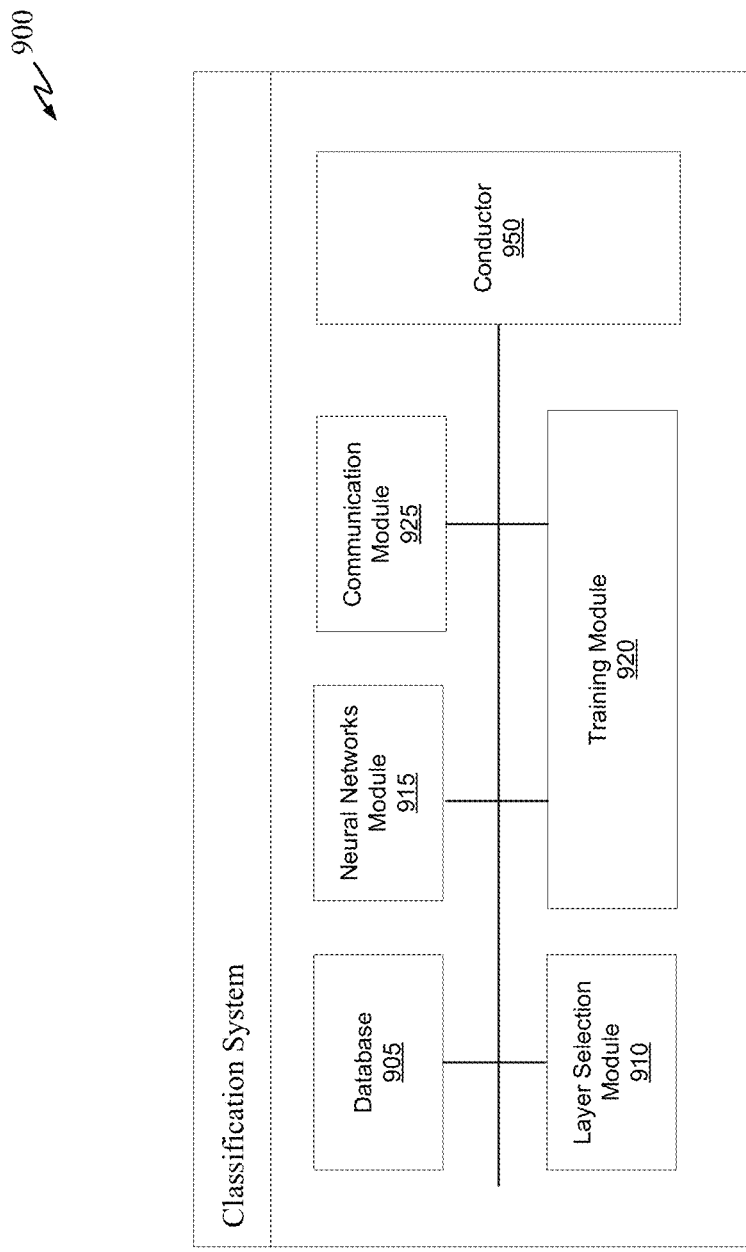
FIG. 9 illustrates a block diagram of a training and classification system in accordance with some embodiments of the present disclosure.

FIG. 9 is a system diagram of an exemplary classification system 900 for training a layer selection model, constructing an inter-classifier neural network, and for classifying an input file using the constructed inter-classifier neural network in accordance with some embodiments of the present disclosure. System 900 may include a database 905, a layer selection module 910, a neural networks module 910, a training module 920, and a communication module 925, and a conductor module 950. System 900 may reside on a single server or may be distributed at various locations on a network. For example, one or more components (e.g., 905, 910, 910, etc.) of system 900 may be distributed across various locations throughout a network. Each component or module of system 900 may communicate with each other and with external entities via communication module 930. Each component or module of system 900 may include its own sub-communication module to further facilitate with intra and/or inter-system communication.

Database 905 may contain training data sets that can be used to train layer selection module 910 and one or more neural networks including inter-classifier neural network 100. Database 905 may also contain media files received from third parties.

Layer selection module 910 includes algorithms and instructions that, when executed by a processor, cause the processor to perform the respective functions and features of processes 400 and 500 relating to layer selection such as, but not limited to, full layer selection, partial layer selection, neuron selection, and layer selection using Bayesian optimization.

Neural networks module 915 may include various pre-trained neural networks in the conductor ecosystem, including APIs to third parties' neural network engines.

Training module 920 includes algorithms and instructions that, when executed by a processor, cause the processor to perform the respective functions and features of processes 400 and 500 relating to training the layer selection module and to the conducted learning process.

Conductor 950 includes algorithms and instructions that, when executed by a processor, cause the processor to perform the respective the functions and features of the conductor as describe above with respect to processes 100, 400, 500, and 600. One or more functions and features of conductor 950 may be shared by other modules (e.g., 910, 915, 920). Conductor module 950 is configured to control the overall flow and function of processes 400, 500, and 600. For example, working in conjunction with one or more modules 910, 915, 920, and 925, conductor 950 includes algorithms and instructions that, when executed by a processor, cause the processor to: (a) selecting one or more hidden layers from a plurality of neural networks to construct an inter-classifier neural network engine, wherein each of the plurality of neural network is pre-trained to perform a classification task; (b) classifying a portion of a training data set using the inter-classifier neural network engine comprising of hidden layers selected from the plurality of neural networks; (c) determining a performance score of the portion of the training data set that was classified;

(d) re-selecting one or more layers from one or more networks of the plurality of neural networks to replace one or more layers of the inter-classifier neural network; and (e) repeating stages (b), (c), and (d) until the performance score reaches a predetermined threshold.

Figure 10:
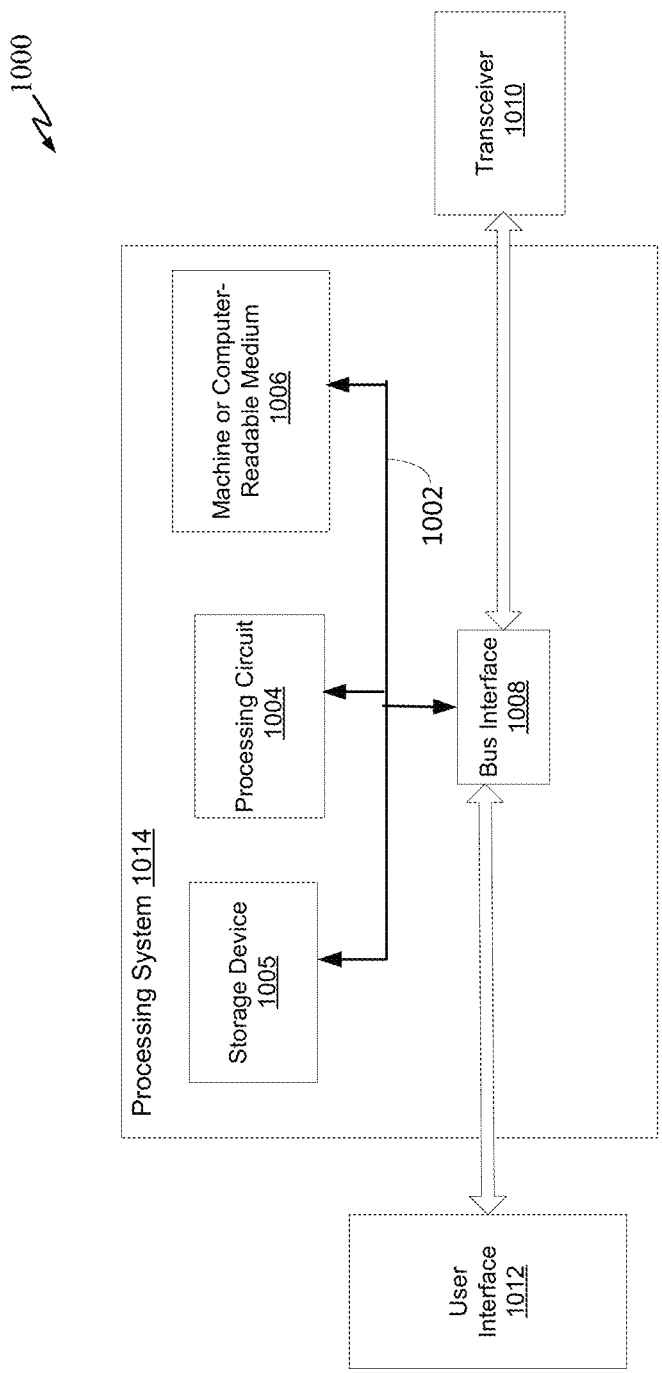
FIG. 10 illustrates a block diagram of a training and classification system in accordance with some embodiments of the present disclosure.

FIG. 10 illustrates an exemplary overall system or apparatus 1000 in which processes 200, 400, 500, and 600 can be implemented. In accordance with various aspects of the disclosure, an element, or any portion of an element, or any combination of elements may be implemented with a processing system 1014 that includes one or more processing circuits 1004. Processing circuits 1004 may include micro-processing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionalities described throughout this disclosure. That is, the processing circuit 1004 may be used to implement any one or more of the processes described above and illustrated in FIGS. 1, 2, 3, 4, 5, 6, and 7.

In the example of FIG. 10, the processing system 1014 may be implemented with a bus architecture, represented generally by the bus 1002. The bus 1002 may include any number of interconnecting buses and bridges depending on the specific application of the processing system 1014 and the overall design constraints. The bus 1002 may link various circuits including one or more processing circuits (represented generally by the processing circuit 1004), the storage device 1005, and a machine-readable, processor-readable, processing circuit-readable or computer-readable media (represented generally by a non-transitory machine-readable medium 1009). The bus 1002 may also link various other circuits such as timing sources, peripherals, voltage regulators, and power management circuits, which are well known in the art, and therefore, will not be described any further. The bus interface 1008 may provide an interface between bus 1002 and a transceiver 1013. The transceiver 1010 may provide a means for communicating with various other apparatus over a transmission medium. Depending upon the nature of the apparatus, a user interface 1012 (e.g., keypad, display, speaker, microphone, touchscreen, motion sensor) may also be provided.

The processing circuit 1004 may be responsible for managing the bus 1002 and for general processing, including the execution of software stored on the machine-readable medium 1009. The software, when executed by processing circuit 1004, causes processing system 1014 to perform the various functions described herein for any particular apparatus. Machine-readable medium 1009 may also be used for storing data that is manipulated by processing circuit 1004 when executing software.

One or more processing circuits 1004 in the processing system may execute software or software components. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, etc.

For example, instructions (e.g., codes) stored in the non-transitory computer readable memory, when executed, may cause the processors to: generate a feature profile for a media file; segment the media file into a first and second segment based at least on the feature profile, each segment has a corresponding portion of the feature profile; identify one or more transcription engines having a predicted high level of accuracy, using a trained machine learning transcription model, for the first and second segments based at least on the corresponding portion of the feature profile of the first and second segments; request a first transcription engine from the identified one or more transcription engines to transcribe the first segment; request a second transcription engine from the identified one or more transcription engines to transcribe the second segment; receive a first transcribed portion of the first segment from the first transcription engine in response to requesting the first transcription engine to transcribe the first segment; receive a second transcribed portion of the second segment from the second transcription engine in response to requesting the second transcription engine to transcribe the second segment; and generate a merged transcription using the first and second transcribed portions.

The software may reside on machine-readable medium 1009. The machine-readable medium 1009 may be a non-transitory machine-readable medium. A non-transitory processing circuit-readable, machine-readable or computer-readable medium includes, by way of example, a magnetic storage device (e.g., solid state drive, hard disk, floppy disk, magnetic strip), an optical disk (e.g., digital versatile disc (DVD), Blu-Ray disc), a smart card, a flash memory device (e.g., a card, a stick, or a key drive), RAM, ROM, a programmable ROM (PROM), an erasable PROM (EPROM), an electrically erasable PROM (EEPROM), a register, a removable disk, a hard disk, a CD-ROM and any other suitable medium for storing software and/or instructions that may be accessed and read by a machine or computer. The terms "machine-readable medium", "computer-readable medium", "processing circuit-readable medium" and/or "processor-readable medium" may include, but are not limited to, non-transitory media such as portable or fixed storage devices, optical storage devices, and various other media capable of storing, containing or carrying instruction(s) and/or data. Thus, the various methods described herein may be fully or partially implemented by instructions and/or data that may be stored in a "machine-readable medium," "computer-readable medium," "processing circuit-readable medium" and/or "processor-readable medium" and executed by one or more processing circuits, machines and/or devices. The machine-readable medium may also include, by way of example, a carrier wave, a transmission line, and any other suitable medium for transmitting software and/or instructions that may be accessed and read by a computer.

The machine-readable medium 1009 may reside in the processing system 1014, external to the processing system 1014, or distributed across multiple entities including the processing system 1014. The machine-readable medium 1009 may be embodied in a computer program product. By way of example, a computer program product may include a machine-readable medium in packaging materials. Those skilled in the art will recognize how best to implement the described functionality presented throughout this disclosure depending on the particular application and the overall design constraints imposed on the overall system.

One or more of the components, processes, features, and/or functions illustrated in the figures may be rearranged and/or combined into a single component, block, feature or function or embodied in several components, steps, or functions. Additional elements, components, processes, and/or functions may also be added without departing from the disclosure. The apparatus, devices, and/or components illustrated in the Figures may be configured to perform one or more of the methods, features, or processes described in the Figures. The algorithms described herein may also be efficiently implemented in software and/or embedded in hardware.

Note that the aspects of the present disclosure may be described herein as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and processes have been described above generally in terms of their functionality. Whether such functionality is implemented as hardware or software depends upon the particular application and design constraints imposed on the overall system.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

CONCLUSION

The enablements described above are considered novel over the prior art and are considered critical to the operation of at least one aspect of the disclosure and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus, if an element can be understood in the context of this specification as including more than one meaning, then its use must be understood as being generic to all possible meanings supported by the specification and by the word or words describing the element.

The definitions of the words or drawing elements described above are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

In the foregoing description and in the figures, like elements are identified with like reference numerals. The use of "e.g.," "etc.," and "or" indicates non-exclusive alternatives without limitation, unless otherwise noted. The use of "including" or "includes" means "including, but not limited to," or "includes, but not limited to," unless otherwise noted.

As used above, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, processes, operations, values, and the like.

The invention claimed is:

1. An inter-classifier neural network, the inter-classifier neural network comprising:
    an input layer;
    an output layer;
    a plurality of hidden layers constructed from hidden layers of different independent neural networks capable of real-time adjustment based on input attributes, wherein each of the independent neural networks is pre-trained to perform a classification task, and wherein the plurality of hidden layers is coupled to the input layer and the output layer, the inter-classifier neural network being configured to dynamically adjust data pathways among the hidden layers in real-time based on the changing attributes of the input data; and
    a self-evolving neural network configured to perform a network selection function to select at least one of the independent neural networks as a best candidate to perform a classification, the selecting including determining which neural network engines from a conductor ecosystem are best candidates to classify a particular portion of a media file based on neural network engines that will perform well based on characteristics of the media file.

2. The inter-classifier neural network of claim 1, wherein the plurality of hidden layers are convolutional layers.

3. The inter-classifier neural network of claim 1, wherein the different independent neural networks have different neural network architectures.

4. The inter-classifier neural network of claim 3, wherein the different neural network architectures comprises a single shot detector (SSD) neural network, a convolutional neural network (CNN), regions with CNN (R-CNN), a faster R-CNN, a YOLO neural network, a neural network based on deformable part models, or a recurrent neural network.

5. The inter-classifier neural network of claim 1, wherein the inter-classifier-neural network is trained, using a training data set, by replacing one or more of the plurality of hidden layers with one or more layers selected from the different independent neural networks until a performance score is above a threshold.

6. The inter-classifier neural network of claim 5, wherein replacing one or more of the plurality of hidden layers comprises selecting adjacent layers or layers farthest away from each other from a first neural network.

7. The inter-classifier neural network of claim 5, wherein replacing one or more of the plurality of hidden layers comprises using Bayesian optimization to select one or more layers from a first neural network of the plurality of neural networks to replace one or more of the plurality of hidden layers of the inter-classifier neural network.

8. The inter-classifier neural network of claim 1, wherein the inter-classifier-neural network is trained, using a training data set, by replacing a portion of a layer of the plurality of hidden layers with a portion of a layer from a first neural network of the plurality of neural networks.

9. The inter-classifier neural network of claim 8, wherein the portion of the layer of the first neural network is selected by dropping out a plurality of neurons from the layer of the first neural network.

10. A method for training a self-evolving inter-classifier neural network, the method comprising:
(a) selecting one or more adaptive hidden layers from a plurality of neural networks to construct an inter-classifier neural network engine, wherein each of the plurality of neural network is pre-trained to perform a classification task and capable of real-time adjustment based on input attributes and dynamically adjusting data pathways among the hidden layers based on the changing attributes of the input data;
(b) classifying a portion of a training data set using the inter-classifier neural network engine comprising of hidden layers selected from the plurality of neural networks;
(c) determining a performance score of the portion of the training data set that was classified;
(d) re-selecting one or more layers from one or more networks of the plurality of neural networks to replace one or more layers of the inter-classifier neural network;
(e) repeating stages (b), (c), and (d) until the performance score reaches a predetermined threshold; and
(f) selecting at least one of neural network of the plurality of neural networks as a best candidate to perform a particular classification using a self-evolving neural network and based on the performance score, the selecting including determining which neural network engines from a conductor ecosystem are best candidates to classify a particular portion of a media file based on neural network engines that will perform well based on characteristics of the media file.

11. The method of claim 10, wherein selecting the one or more layers from each of the plurality of neural networks comprises selecting all features within a selected layer.

12. The method of claim 11, wherein selecting the one or more layers from each of the plurality of neural networks comprises selecting adjacent layers or layers farthest away from each other.

13. The method of claim 11, wherein selecting the one or more layers from each of the plurality of neural networks comprises selecting the one or more layers from a first neural network using Bayesian optimization.

14. The method of claim 13, wherein selecting the one or more layers from the first neural network using Bayesian optimization comprises:
selecting, randomly, two or more layers from the first neural network;
finding a maximum of an acquisition function of the Bayesian optimization;
selecting a first new layer based on the maximum of the acquisition function; and
updating an approximation of an objective function of the Bayesian optimization.

15. The method of claim 14, further comprising:
finding a new maximum of the acquisition function;
selecting a second new layer based on the new maximum of the acquisition function;
updating a second approximation of the objective function of the Bayesian optimization;
repeating a process comprising a) finding a new maximum, b) selecting a new layer, and c) updating a new approximation until a termination criterion is reached;
eliminating selected layers having a performance score below a predetermined threshold;
using layers that are not eliminated to generate one or more layers of the inter-classifier neural network.

16. The method of claim 15, further comprising:
evaluating the cost function of the inter-classifier neural network having layers from two or more of the plurality of neural networks; and
retraining the inter-classifier neural network by replacing one or more layers with one or more new layers from the plurality of neural networks.

17. The method of claim 10, wherein selecting the one or more layers from each of the plurality of neural networks comprises selecting a portion of a selected layer of a first neural network.

18. The method of claim 17, wherein selecting the portion of the selected layer of the first neural network comprises dropping out a plurality of neurons within the selected layer of first neural network.

19. The method of claim 18, wherein the plurality of neural networks comprises two or more of a single shot detector (SSD) neural network, a convolutional neural network (CNN), regions with CNN (R-CNN), a faster R-CNN, a YOLO neural network, a neural network based on deformable part models, or a recurrent neural network.

20. A method for training an inter-classifier neural network, the method comprising:
(a) selecting one or more hidden layers from a plurality of neural networks to construct one or more hidden layers of the inter-classifier neural network engine, wherein each of the plurality of neural network is pre-trained to perform a classification task and capable of real-time adjustment based on input attributes and dynamically adjusting data pathways among the hidden layers based on the changing attributes of the input data;
(b) classifying contents of a training data set using the inter-classifier neural network that dynamically adjusts its configuration in response to the classification results; and repeating (a) and (b) until a performance score of the inter-classifier neural network is above a predetermined threshold, wherein the performance score is determined by comparing the classification result with ground truth data of the training data set; and (c) selecting at least one of neural network of the plurality of neural networks as a best candidate to perform a particular classification based on the performance score using a self-evolving neural network, the selecting including determining which neural network engines from a conductor ecosystem are best candidates to classify a particular portion of a media file based on neural network engines that will perform well based on characteristics of the media file.

* * * * *